United States Patent
Li et al.

(10) Patent No.: US 11,805,440 B2
(45) Date of Patent: Oct. 31, 2023

(54) COMMUNICATION METHOD, APPARATUS, DEVICE, SYSTEM, AND STORAGE MEDIUM FOR TARGET SERVICE PACKET RETRANSMISSION

(71) Applicant: HUAWEI TECHNOLOGIES CO., LTD., Guangdong (CN)

(72) Inventors: Bingzhao Li, Beijing (CN); Lei Guan, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 17/464,378

(22) Filed: Sep. 1, 2021

(65) Prior Publication Data

US 2021/0400528 A1 Dec. 23, 2021

Related U.S. Application Data

(63) Continuation of application No. PCT/CN2019/079373, filed on Mar. 22, 2019.

(51) Int. Cl.
*H04W 28/04* (2009.01)
*H04L 1/18* (2023.01)
*H04W 4/06* (2009.01)

(52) U.S. Cl.
CPC .............. *H04W 28/04* (2013.01); *H04L 1/18* (2013.01); *H04W 4/06* (2013.01)

(58) Field of Classification Search
CPC .......... H04W 28/04; H04W 4/06; H04L 1/18; H04L 1/1896; H04L 1/1893; H04L 1/1628

See application file for complete search history.

(56) References Cited

U.S. PATENT DOCUMENTS

| | | | |
|---|---|---|---|
| 2009/0262678 A1* | 10/2009 | Oyman | H04L 5/0091 370/315 |
| 2010/0290383 A1 | 11/2010 | Wu et al. | |
| 2010/0293428 A1* | 11/2010 | Luo | H04H 20/06 714/E11.131 |
| 2013/0229906 A1 | 9/2013 | Akkarakaran et al. | |

(Continued)

FOREIGN PATENT DOCUMENTS

| | | |
|---|---|---|
| CN | 103812622 A | 5/2014 |
| CN | 104486052 A | 4/2015 |

(Continued)

OTHER PUBLICATIONS

PCT International Search Report and Written Opinion issued in International Application No. PCT/CN2019/079373 dated Dec. 20, 2019, 10 pages (partial English translation).

(Continued)

*Primary Examiner* — Afshawn M Towfighi
(74) *Attorney, Agent, or Firm* — Fish & Richardson P.C.

(57) ABSTRACT

Examples in this application provide a communication method, apparatus, device, and system, and a storage medium. One example method includes determining, by a terminal device, that the first data packet of the target service sent by the first network device is not successfully received, sending, by the terminal device, a first message to a second network device, to request to retransmit the first data packet, and receiving, by the terminal device, the first data packet from the second network device.

20 Claims, 10 Drawing Sheets

(56) References Cited

U.S. PATENT DOCUMENTS

| | | | |
|---|---|---|---|
| 2015/0012793 A1* | 1/2015 | Ryu | H04L 49/557 |
| | | | 714/748 |
| 2017/0289021 A1* | 10/2017 | Säily et al. | H04W 74/006 |
| 2017/0339599 A1* | 11/2017 | Wu | H04W 28/0864 |
| 2018/0262289 A1* | 9/2018 | Li | H04W 52/143 |
| 2019/0007268 A1 | 1/2019 | Wager et al. | |
| 2020/0323024 A1* | 10/2020 | Huang | H04W 76/40 |

FOREIGN PATENT DOCUMENTS

| | | |
|---|---|---|
| CN | 104770032 A | 7/2015 |
| CN | 106664245 A | 5/2017 |
| CN | 107733577 A | 2/2018 |
| CN | 108617029 A | 10/2018 |
| CN | 108631961 A | 10/2018 |
| CN | 109392028 A | 2/2019 |
| WO | 2018022854 A2 | 2/2018 |
| WO | 2018028391 A1 | 2/2018 |
| WO | 2018143703 A1 | 8/2018 |

OTHER PUBLICATIONS

NTT Docomo, Inc., "Study on New Radio Access Technology," 3GPP TSG RAN meeting #75, RP-170376, Dubrovnik, Croatia, Mar. 6-9, 2017, 42 pages.
Office Action issued in Chinese Application No. 201980091620.1 dated Apr. 18, 2022, 10 pages.
Xiandong, "Research on Dual Connectivity in LTE-Advanced System," Beijing University of Posts and Telecommunications, Aug. 2015, 2 pages (with English abstract).
Extended European Search Report issued in European Application No. 19920944.6 dated Dec. 14, 2021, 9 pages.

* cited by examiner

COMMUNICATION METHOD, APPARATUS, DEVICE, SYSTEM, AND STORAGE MEDIUM FOR TARGET SERVICE PACKET RETRANSMISSION

CROSS-REFERENCE TO RELATED APPLICATIONS

This application is a continuation of International Application No. PCT/CN2019/079373, filed on Mar. 22, 2019, the disclosure of which is hereby incorporated by reference in its entirety.

TECHNICAL FIELD

This application relates to the field of communication technologies, and in particular, to a communication method, apparatus, device, system, and a storage medium.

BACKGROUND

A multimedia broadcast multicast service (Multimedia Broadcast Multicast Service, MBMS) service is an important part of the development of 3rd generation partnership project ($3^{rd}$ Generation Partnership Project, 3GPP) services. An MBMS mainly means that a network side sends same multimedia data to a plurality of receivers on a network simultaneously. Compared with single-user transmission, the MBMS greatly saves air interface resources.

In current MBMS service transmission, all terminals in a cell receive same MBMS data. Consequently, a modulation scheme and a coding rate used to send the MBMS data are restricted by a terminal at the very edge of a cell, leading to low spectral efficiency of an MBMS service.

SUMMARY

Embodiments of this application provide a communication method, apparatus, device, and system, and a storage medium, to improve spectral efficiency of multicast.

According to a first aspect, an embodiment of this application provides a communication method. The method includes: A terminal device determines that a first data packet of a target service sent by a first network device is not successfully received; the terminal device sends a first message to a second network device, where the first message is used to request to retransmit the first data packet; and after receiving the first message, the second network device sends the first data packet to the terminal device. In this way, the second network device supplementarily retransmits the first data packet that fails to be received from the first network device, so that the first network device can lower a coverage requirement on an edge terminal device, to allow the first network device to use a more efficient multicast transmission modulation scheme and coding rate, thereby improving spectral efficiency of multicast.

Optionally, the first message is a radio link control RLC status report message or a packet data convergence protocol PDCP status report message.

Optionally, the target service may be a multicast service.

In an implementation, that a terminal device determines that a first data packet sent by a first network device is not successfully received includes: The terminal device determines that the first data packet is not received; or the terminal device fails to parse the received first data packet.

That the terminal device determines that the first data packet is not received includes the following three cases.

Case 1: The terminal device determines, based on scheduling information that is of the first data packet and that is received from the first network device, that the first data packet is not received.

Case 2: The terminal device determines, based on a received sequence number of a data packet of the target service sent by the first network device, that the first data packet is not received.

Case 3: The terminal device determines, based on data packet transmission status information received from the second network device, that the first data packet is not received, where the data packet transmission status information is used to indicate a data packet of the target service currently transmitted by the first network device.

In the foregoing three cases, the terminal device can accurately determine that the first data packet is not received.

Optionally, the first message further includes related information of the first data packet.

Optionally, the related information of the first data packet includes at least one of the following: a data packet sequence number of the first data packet or a transmission time of the first data packet.

In a possible implementation, a unicast bearer is established between the terminal device and the second network device. In this way, that the terminal device sends a first message to a second network device may be that the terminal device sends the first message to the second network device by using the unicast bearer. That the terminal device receives the first data packet from the second network device may be that the terminal device receives the first data packet from the second network device by using the unicast bearer. In this way, timeliness of communication between the terminal device and the first network device can be improved.

In a possible implementation, before the terminal device sends the first message to the second network device, the terminal device receives indication information from the second network device, where the indication information is used to indicate that the second network device supports compensated transmission of the data packet of the target service sent by the first network device.

According to a second aspect, an embodiment of this application provides a communication method. The method includes: A second network device receives a first message from a terminal device, where the first message is used to request to retransmit a first data packet of a target service sent by a first network device. Then, the second network device obtains the first data packet, and sends the obtained first data packet to the terminal device. In this application, the second network device supplementarily retransmits the first data packet that fails to be received from the first network device, so that the first network device can lower a coverage requirement on an edge terminal device, to allow the first network device to use a more efficient multicast transmission modulation scheme and coding rate, thereby improving spectral efficiency of multicast.

Optionally, the target service is a multicast service.

In a possible implementation, before the second network device receives the first message from the terminal device, the second network device receives data packet transmission status information from the first network device, where the data packet transmission status information is used to indicate a data packet of the target service currently transmitted by the first network device. Then, the second network device sends the data packet transmission status information to the terminal device, so that the terminal device determines, based on the data packet transmission status information received from the second network device, that the first data packet is not received.

Optionally, the first message further includes related information of the first data packet.

Optionally, the related information of the first data packet includes at least one of the following: a data packet sequence number of the first data packet or a transmission time of the first data packet.

In a possible implementation, a unicast bearer is established between the terminal device and the second network device. In this way, that a second network device receives a first message from a terminal device may be that the second network device receives the first message from the terminal device by using the unicast bearer. That the second network device sends the first data packet to the terminal device may be that the second network device sends the first data packet to the terminal device by using the unicast bearer. In this way, timeliness of communication between the terminal device and the first network device is improved.

In a possible implementation, before the second network device receives the first message from the terminal device, the second network device sends first indication information to the terminal device, where the first indication information is used to indicate that the second network device supports compensated transmission of a data packet of the target service sent by the first network device.

Optionally, before the second network device sends the first indication information to the terminal device, the second network device receives second indication information from the first network device or a third network device, where the second indication information is used to indicate that the second network device needs to perform compensated transmission of the data packet of the target service sent by the first network device.

In a possible implementation, a manner in which the second network device obtains the first data packet may be: The second network device sends a second message to the first network device or a third network device, where the second message is used to request the first data packet; and the second network device receives the first data packet from the first network device or the third network device.

Optionally, the first network device and the second network device are access network devices, and the third network device is a core network device.

In a possible implementation, a manner in which the second network device obtains the first data packet may be: The second network device receives a data packet of the target service from the first network device; and the second network device obtains the first data packet based on the data packet of the target service received from the first network device, where the data packet of the target service includes the first data packet.

According to a third aspect, an embodiment of this application provides a communication apparatus. The communication apparatus may be a terminal device, or may be a component (for example, an integrated circuit or a chip) of the terminal device. The communication apparatus may implement functions corresponding to steps in the method in the first aspect. The functions may be implemented by hardware, or may be implemented by hardware executing corresponding software. The hardware or the software includes one or more units or modules corresponding to the foregoing functions.

In a possible design, the apparatus includes a processor. The processor is configured to support the apparatus in performing the corresponding functions in the method in the first aspect. The apparatus may further include a memory. The memory is configured to be coupled to the processor, and stores program instructions and data that are necessary for the apparatus. Optionally, the apparatus further includes a transceiver. The transceiver is configured to support communication between the apparatus and another network element. The transceiver may be an independent receiver, an independent transmitter, or a transceiver having transmission and receiving functions.

In a possible design, the communication apparatus includes a processing unit and a transceiver unit. The processing unit is configured to determine that a first data packet of a target service sent by a first network device is not successfully received. The transceiver unit is configured to: send a first message to a second network device, where the first message is used to request to retransmit the first data packet; and receive the first data packet from the second network device.

According to a fourth aspect, an embodiment of this application provides a communication apparatus. The communication apparatus may be a second network device, or may be a component (for example, an integrated circuit or a chip) of the second network device. The communication apparatus may implement functions corresponding to steps in the method in the second aspect. The functions may be implemented by hardware, or may be implemented by hardware executing corresponding software. The hardware or the software includes one or more units or modules corresponding to the foregoing functions.

In a possible design, the apparatus includes a processor. The processor is configured to support the apparatus in performing the corresponding functions in the method in the second aspect. The apparatus may further include a memory. The memory is configured to be coupled to the processor, and stores program instructions and data that are necessary for the apparatus. Optionally, the apparatus further includes a transceiver. The transceiver is configured to support communication between the apparatus and another network element. The transceiver may be an independent receiver, an independent transmitter, or a transceiver having transmission and receiving functions.

In a possible design, the communication device includes a transceiver unit and a processing unit. The transceiver unit is configured to receive a first message from a terminal device, where the first message is used to request to retransmit a first data packet of a target service sent by a first network device. The processing unit is configured to obtain the first data packet, and send the first data packet to the terminal device.

According to a fifth aspect, an embodiment of this application provides a communication device. The communication device includes a processor and a transceiver. The processor and the transceiver are configured to perform the communication method according to either of the first aspect and the second aspect.

According to a sixth aspect, an embodiment of this application provides an apparatus. The apparatus exists in a product form of a chip. A structure of the apparatus includes a processor and a memory. The memory is configured to be coupled to the processor, and stores program instructions and data that are necessary for the apparatus. The processor is configured to execute the program instructions stored in the memory, to enable the apparatus to perform functions of the terminal device in the foregoing methods.

According to a seventh aspect, an embodiment of this application provides an apparatus. The apparatus exists in a product form of a chip. A structure of the apparatus includes a processor and a memory. The memory is configured to be coupled to the processor, and stores program instructions and data that are necessary for the apparatus. The processor is configured to execute the program instructions stored in the memory, to enable the apparatus to perform functions of the second network device in the foregoing methods.

According to an eighth aspect, an embodiment of this application provides a computer storage medium. The storage medium includes computer instructions. When the instructions are executed by a computer, the computer is enabled to implement the communication method according to either of the first aspect and the second aspect.

According to a ninth aspect, an embodiment of this application provides a computer program product, where the program product includes a computer program, the computer program is stored in a readable storage medium, at least one processor of a communication apparatus can read the computer program from the readable storage medium, and the at least one processor executes the computer program, to enable the communication apparatus to perform the communication method according to either of the first aspect and the second aspect.

According to a tenth aspect, an embodiment of this application provides a communication system. The system includes the terminal device, the first network device, and the second network device.

According to the communication method, apparatus, device, and system, and the storage medium provided in the embodiments of this application, the first network device sends the first data packet of the target service to the terminal device. When the terminal device determines that the first data packet of the target service sent by the first network device is not successfully received, the terminal device sends the first message to the second network device, to request to retransmit the first data packet. After receiving the first message, the second network device sends the first data packet to the terminal device. In this way, the second network device supplementarily retransmits the first data packet that fails to be received from the first network device, so that the first network device can lower the coverage requirement on the edge terminal device, to allow the first network device to use the more efficient multicast transmission modulation scheme and coding rate, thereby improving the spectral efficiency of multicast.

DESCRIPTION OF EMBODIMENTS

The following describes the technical solutions in embodiments of this application with reference to the accompanying drawings in the embodiments of this application.

To facilitate understanding of the embodiments of this application, related concepts in the embodiments of this application are first briefly described as follows:

An MBMS service is generally provided in a broadcast mode. For example, in long term evolution (Long Term Evolution, LTE), in each cell, several subframes may be used to send the MBMS service, and all terminal devices may receive MBMS data by receiving the several subframes. The terminal device may receive an MBMS subframe in an idle mode or in a connected mode. A network device may not need to learn of terminal devices that are receiving the MBMS data. For a terminal device that receives the MBMS service in the connected mode, the network device may learn, by initiating a counting (counting) process, of terminal devices in the connected mode that are receiving the MBMS service.

In a multicast broadcast single frequency network (Multicast Broadcast Single Frequency Network, MBSFN), synchronous transmission is performed in a plurality of cells at a same time at a same frequency. Based on this transmission manner, frequency resources can be saved and spectrum utilization can be improved. In addition, a diversity effect brought by multi-cell intra-frequency transmission can resolve problems such as coverage holes, enhance reception reliability, and improve coverage. The multi-cell intra-frequency transmission requires simultaneous transmission of identical waveforms from a plurality of cells. In this way, a terminal receiver can consider a plurality of MBSFN cells as one large cell. In addition, the terminal device does not suffer from inter-cell interference during transmission in neighboring cells, and benefits from superimposition of signals from the plurality of MBSFN cells. A plurality of cells in which the identical waveforms are transmitted form an MBSFN area (area). A plurality of physical multicast channels (Physical Multicast Channel, PMCH) may be configured in the MBSFN area, where each channel may carry each MBMS service.

In single-cell point-to-multipoint (Single-Cell Point-to-Multipoint, SC-PTM for short), in a cell, service data are simultaneously scheduled for a plurality of terminal devices by using radio network temporary identifiers (G-Radio Network Temporary Identity, G-RNTI), and each G-RNTI may be associated with one MBMS service. In this way, in one area, data only needs to be sent to a cell that includes the terminal device, and data is not sent to a cell that does not include the terminal device, thereby saving air interface resources.

Figure 1:
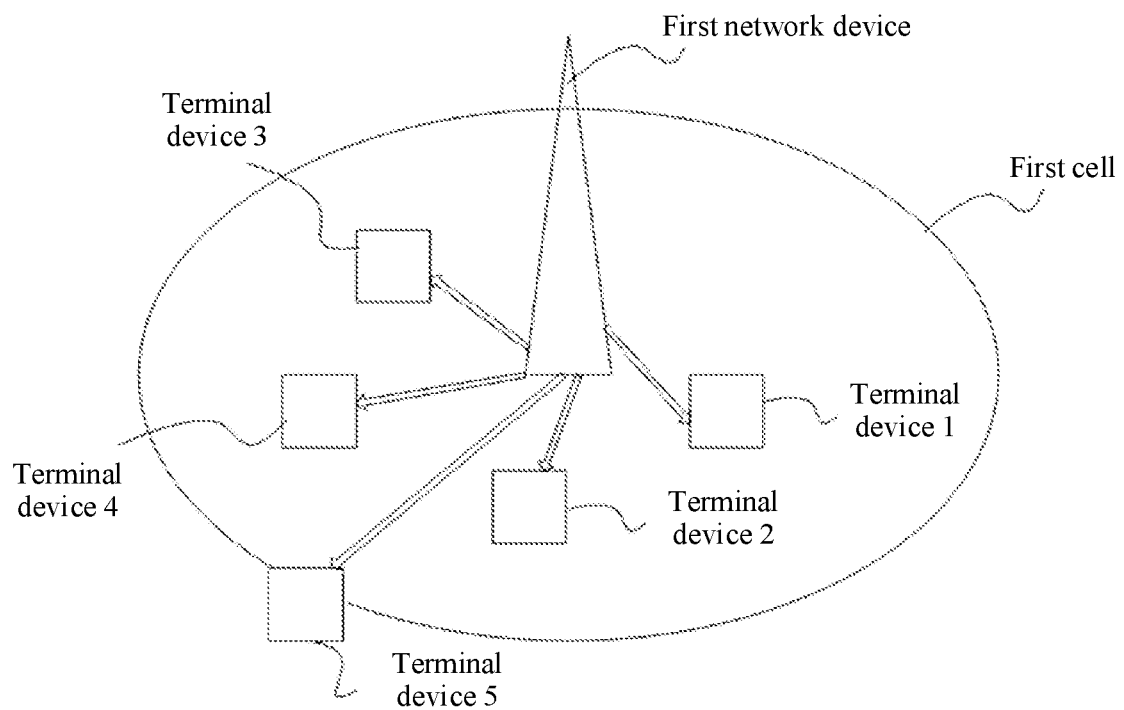
FIG. 1 is a structural diagram of a communication system in a current technology.

FIG. 1 is a schematic diagram of a communication system in a current technology. In a current broadcast technology, in both SC-PTM and an MBSFN, all terminal devices in one area receive same content. Therefore, a modulation scheme and a coding rate used to send the content are restricted by a terminal device with worst signal quality. As shown in FIG. 1, there are five terminal devices in a cell. Four terminal devices are in the middle of the cell, and one terminal device (that is, a terminal device 5) is at the edge of the cell. In this case, in consideration of a reception effect of the terminal device 5 at the very edge, with determined resources, a transport block size is restricted by the terminal device 5 with worst signal quality, leading to low spectral efficiency of MBMS service transmission.

Figure 2:
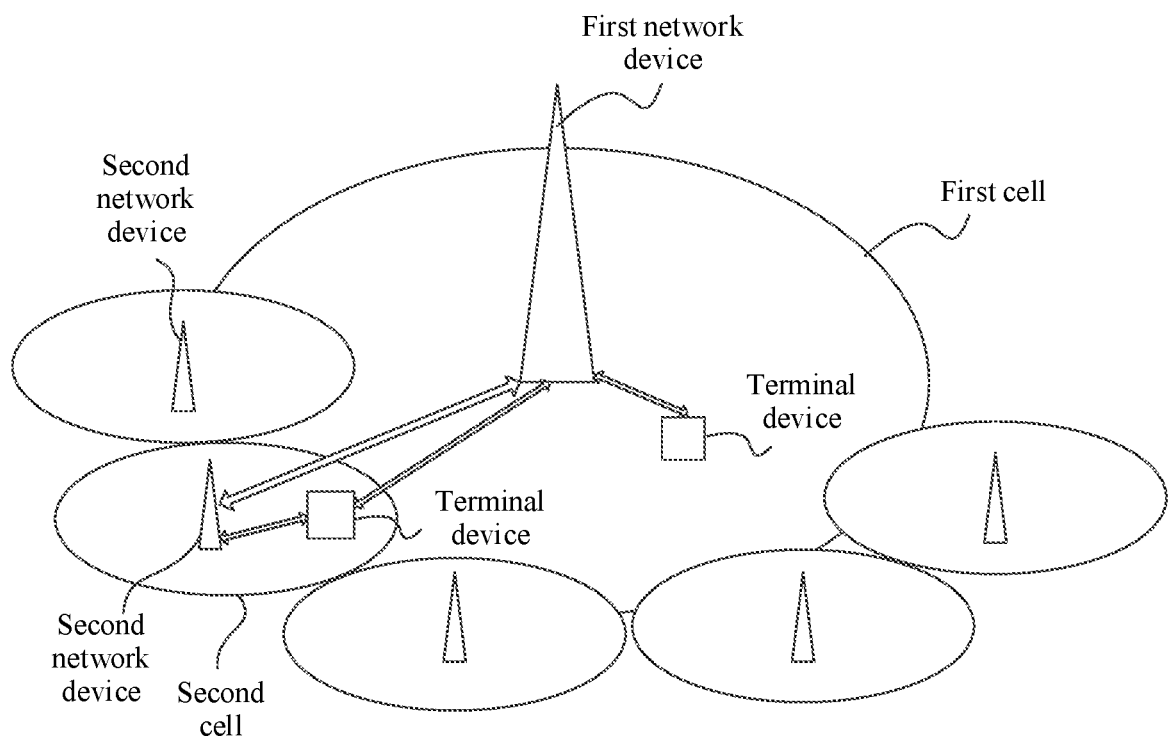
FIG. 2 is a schematic diagram of a communication system according to an embodiment of this application.

FIG. 2 is a schematic diagram of a communication system according to an embodiment of this application. As shown in FIG. 2, to resolve the foregoing technical problem, in this embodiment of this application, a second network device is disposed at the edge of a cell. If a terminal device cannot receive a first data packet from a first network device, the terminal device receives the first data packet from the second network device. In this way, it is ensured that an edge terminal device can receive the first data packet, and spectral efficiency of MBMS service transmission is improved.

Network devices in the embodiments of this application, for example, the first network device and the second network device, are devices in a wireless network, for example, radio access network (radio access network, RAN) nodes that connect a terminal to the wireless network. Currently, some examples of the RAN node are: a gNB, a transmission reception point (transmission reception point, TRP), an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB or a home Node B, HNB), a baseband unit (base band unit, BBU), or a wireless fidelity (wireless fidelity, Wi-Fi) access point (access point, AP). In a network structure, the network device may include a centralized unit (centralized unit, CU) node, a distributed unit (distributed unit, DU) node, or a RAN device including the CU node and the DU node. This is not limited herein.

The terminal device in the embodiments of this application may be a wireless terminal device or a wired terminal device. The wireless terminal device may be a device having a wireless transceiver function, and may be deployed on land, including an indoor or outdoor device, a handheld device, or a vehicle-mounted device; or may be deployed on a water surface (for example, on a steamboat); or may be deployed in the air (for example, on an airplane, a balloon, or a satellite). The terminal device may be a mobile phone (mobile phone), a tablet computer (Pad), a computer having a wireless transceiver function, a virtual reality (Virtual Reality, VR) terminal device, an augmented reality (Augmented Reality, AR) terminal device, a wireless terminal device in industrial control (industrial control), a wireless terminal device in self driving (self driving), a wireless terminal device in telemedicine (remote medical), a wireless terminal device in a smart grid (smart grid), a wireless terminal device in transportation safety (transportation safety), a wireless terminal device in a smart city (smart city), a wireless terminal device in a smart home (smart home), or the like. This is not limited herein. It may be understood that, in the embodiments of this application, the terminal device may also be referred to as user equipment (user equipment, UE).

The communication system shown in FIG. 2 may be a 2G, 3G, 4G, or 5G communication system, or a next generation (next generation) communication system, for example, a global system for mobile communications (Global System for Mobile communications, GSM), a code division multiple access (Code Division Multiple Access, CDMA) system, a time division multiple access (Time Division Multiple Access, TDMA) system, a wideband code division multiple access (Wideband Code Division Multiple Access Wireless, WCDMA) system, a frequency division multiple access (Frequency Division Multiple Addressing, FDMA) system, an orthogonal frequency division multiple access (Orthogonal Frequency-Division Multiple Access, OFDMA) system, a single-carrier FDMA (SC-FDMA) system, a general packet radio service (General Packet Radio Service, GPRS) system, a long term evolution (Long Term Evolution, LTE) system, or a new radio (new radio, NR) communication system.

In the embodiments of this application, the network device and the terminal device may communicate with each other by using a licensed spectrum (licensed spectrum), or may communicate with each other by using an unlicensed spectrum (unlicensed spectrum), or may communicate with each other by using both a licensed spectrum and an unlicensed spectrum. The network device and the terminal device may communicate with each other by using a spectrum below 6 GHz, or may communicate with each other by using a spectrum above 6 GHz, or may communicate with each other by using both a spectrum below 6 GHz and a spectrum above 6 GHz. A spectrum resource used between the network device and the terminal device is not limited in the embodiments of this application.

Unless otherwise specified, "transmission" (transmit/transmission) in the embodiments of this application refers to bidirectional transmission, and includes a sending action and/or a receiving action. Specifically, "transmission" in the embodiments of this application includes data sending, data receiving, or data sending and receiving. That is, data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

A service (service) in the embodiments of this application is a communication service obtained by a terminal device from a network side. The communication service includes a control plane service and/or a data plane service, for example, a voice service and a data traffic service. The sending or receiving of the service includes sending or receiving of service-related data (data) or signaling (signaling). The service in the embodiments of this application may include but is not limited to an enhanced mobile broadband (enhanced Mobile Broadband, eMBB) service, an ultra-reliable low-latency communication (Ultra-Reliable and Low-Latency Communication, URLLC) service, a massive machine type communication (massive Machine Type Communication, mMTC) service, and the like.

It should be understood that in the embodiments of this application, "B corresponding to A" indicates that B is associated with A. In an implementation, B may be determined based on A. However, it should be further understood that determining B based on A does not mean that B is determined based on only A. B may alternatively be determined based on A and/or other information.

In the descriptions of this application, the term "a plurality of" means two or more than two unless otherwise specified.

In addition, to clearly describe the technical solutions in the embodiments of this application, terms such as "first" and "second" are used in the embodiments of this application to distinguish between same items or similar items whose functions and purposes are basically the same. A person skilled in the art may understand that the terms such as "first" and "second" are not intended to limit a quantity or an execution sequence, and the terms such as "first" and "second" do not indicate a definite difference.

Figure 3:
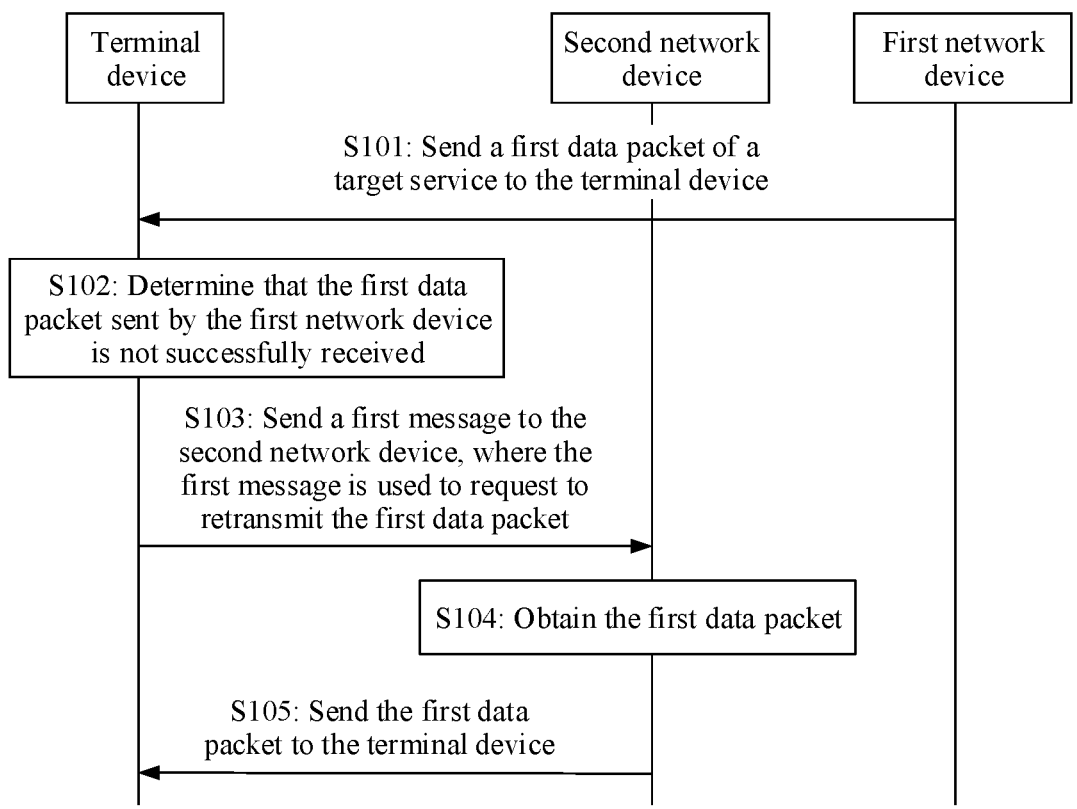
FIG. 3 is a flowchart of a communication method according to an embodiment of this application.

FIG. 3 is a flowchart of a communication method according to an embodiment of this application. As shown in FIG. 3, the method in this embodiment of this application may include the following steps.

S101: A first network device sends a first data packet of a target service to a terminal device.

Referring to FIG. 2, a communication system in this embodiment of this application includes one first network device and a plurality of second network devices. The first network device is located in a first cell, and is configured to communicate with the terminal device in the first cell. The second network device is located at the edge of the first cell, and may serve a small area. An area served by the second network device is denoted as a second cell.

The first network device may communicate with the second network device, and the first cell and the second cell have an overlapping area. If the terminal device is located in an area that is in the first cell and that does not overlap with the second cell, the first network device may communicate with the terminal device. If the terminal device is located in the overlapping area between the first cell and the second cell, both the first network device and the second network device may communicate with the terminal device. If the terminal device is located in an area that is in the second cell and that does not overlap with the first cell, the second network device may communicate with the terminal device.

Optionally, the target service in the embodiments of this application may include but is not limited to an enhanced mobile broadband (enhanced Mobile Broadband, eMBB) service, an ultra-reliable low-latency communication (Ultra-Reliable and Low-Latency Communication, URLLC) service, a massive machine type communication (massive Machine Type Communication, mMTC) service, and the like.

Optionally, the target service in the embodiments of this application may be a multicast service, for example, an MBMS service.

As shown in FIG. 3, the first network device sends the first data packet of the target service to each terminal device in a first area, and the terminal device receives the first data packet of the target service on a multicast channel of the first cell. Because quality of communication between the terminal device and the first network device is different, some terminal devices in the first cell may receive the first data packet sent by the first network device, and some terminal devices may not receive the first data packet sent by the first network device. For example, as shown in FIG. 2, a terminal device relatively close to the first network device may receive the first data packet sent by the first network device, and a terminal device relatively far from the first network device fails to receive the first data packet sent by the first network device.

S102: The terminal device determines that the first data packet sent by the first network device is not successfully received.

In a possible implementation, that the terminal device determines that the first data packet sent by the first network device is not successfully received in S102 may include the following two manners.

Manner 1: The terminal device determines that the first data packet is not received. For example, the terminal device determines that the first data packet sent by the first network device is not received within a preset time. In this case, the terminal device may determine that the first data packet sent by the first network device is not successfully received.

Manner 2: The terminal device fails to parse the received first data packet. For example, although the terminal device receives the first data packet from the first network device, the terminal device cannot parse the first data packet. In this case, the terminal device may determine that the first data packet sent by the first network device is not successfully received.

For the foregoing Manner 1, the terminal device may determine, in the following three cases, that the first data packet is not received.

Case 1: The terminal device determines, based on scheduling information that is of the first data packet and that is received from the first network device, that the first data packet is not received.

For example, the first network device sends a PDCCH to the terminal device, where DCI of the PDCCH indicates that one first data packet is scheduled, but the terminal device does not receive the first data packet from a PDSCH based on the PDCCH. In this case, the terminal device may determine that the first data packet sent by the first network device is not successfully received. Alternatively, the terminal device receives the first data packet from a PDSCH based on the PDCCH, but a parsing error occurs when the terminal device parses the first data packet. In this case, the terminal device may determine that the first data packet sent by the first network device is not successfully received.

Case 2: The terminal device determines, based on a received sequence number of a data packet of the target service sent by the first network device, that the first data packet is not received.

Optionally, the sequence number of the first data packet may be a sequence number of a radio link control (Radio Link Control, RLC) layer, a sequence number of a packet data convergence protocol (Packet Data Convergence Protocol, PDCP) layer, or a sequence number of another layer.

Specifically, the first network device numbers a to-be-sent data packet of the target service, and may send the data packet of the target service based on the sequence number of the data packet. In this way, the terminal device may determine, based on the received sequence number of the data packet of the target service sent by the first network device, that the first data packet is not received. For example, the terminal device receives data packets whose sequence numbers are 1 and 3, but does not receive a data packet whose sequence number is 2, and the data packet whose sequence number is 2 is the first data packet. In this way, the terminal device may determine, based on the received sequence number of the data packet of the target service sent by the first network device, that the first data packet is not received.

Case 3: The terminal device determines, based on data packet transmission status information received from the second network device, that the first data packet is not received, where the data packet transmission status information is used to indicate a data packet of the target service currently transmitted by the first network device.

Specifically, the first network device sends, to the second network device, the data packet transmission status information of the target service currently transmitted, where the data packet transmission status information is used to indicate the data packet of the target service currently transmitted by the first network device. Then, the second network device sends the received data packet transmission status information to the terminal device. In this way, the terminal device determines, based on the data packet transmission status information received from the second network device, that the first data packet is not received.

For example, data packets of the target service currently sent by the first network device to the terminal device are a data packet 1, a data packet 2, a data packet 3, and a data packet 4. Correspondingly, the first network device sends, to the second network device, data packet transmission status information of the target service currently sent to the terminal device. The data packet transmission status information may be a quantity of sent data packets, that is, the data packet transmission status information is 4. Then, the second network device sends the data packet transmission status information 4 to the terminal device, and the terminal device may determine, based on the data packet transmission status information 4, that the first network device sends four data packets. Assuming that the terminal device receives the data packet 1 and the data packet 3 from the first network device, the terminal device may determine, based on the data packet transmission status information 4 and the received data packet 1 and the data packet 3, that the terminal device does not receive the data packet 2 and the data packet 3.

S103: The terminal device sends a first message to the second network device, where the first message is used to request to retransmit the first data packet.

When the terminal device determines that the first data packet of the target service sent by the first network device is not successfully received, the terminal device sends the first message to the second network device, to request to retransmit the first data packet.

Optionally, the first message may be used to request the second network device to send the first data packet to the terminal device.

Optionally, the first message further includes related information of the first data packet.

For example, the related information of the first data packet includes but is not limited to at least one of the following: a data packet sequence number of the first data packet or a transmission time of the first data packet. In this way, after receiving the first message, the second network device may determine the first data packet based on the related information of the first data packet included in the first message.

Optionally, the first message may be an RLC status report message or a PDCP status report message.

S104: The second network device obtains the first data packet.

S105: The second network device sends the first data packet to the terminal device.

It should be noted that S104 may be performed before S101, or may be performed after S101. This is not limited in this embodiment of this application.

For example, when sending the first data packet to each terminal device in the first cell, the first network device sends the first data packet to the second network device. In this way, the second network device stores the first data packet. When receiving the first message sent by the terminal device, the second network device sends the first data packet to the terminal device.

Optionally, the second network device may further obtain the first data packet from another device. This is not limited in this embodiment of this application.

According to the communication method provided in this embodiment of this application, the first network device sends the first data packet of the target service to the terminal device. When the terminal device determines that the first data packet of the target service sent by the first network device is not successfully received, the terminal device sends the first message to the second network device, to request to retransmit the first data packet. After receiving the first message, the second network device sends the first data packet to the terminal device. In this way, the second network device supplementarily retransmits the first data packet that fails to be received from the first network device, so that the first network device can lower a coverage requirement on an edge terminal device, to allow the first network device to use a more efficient multicast transmission modulation scheme and coding rate, thereby improving spectral efficiency of multicast.

Figure 4:
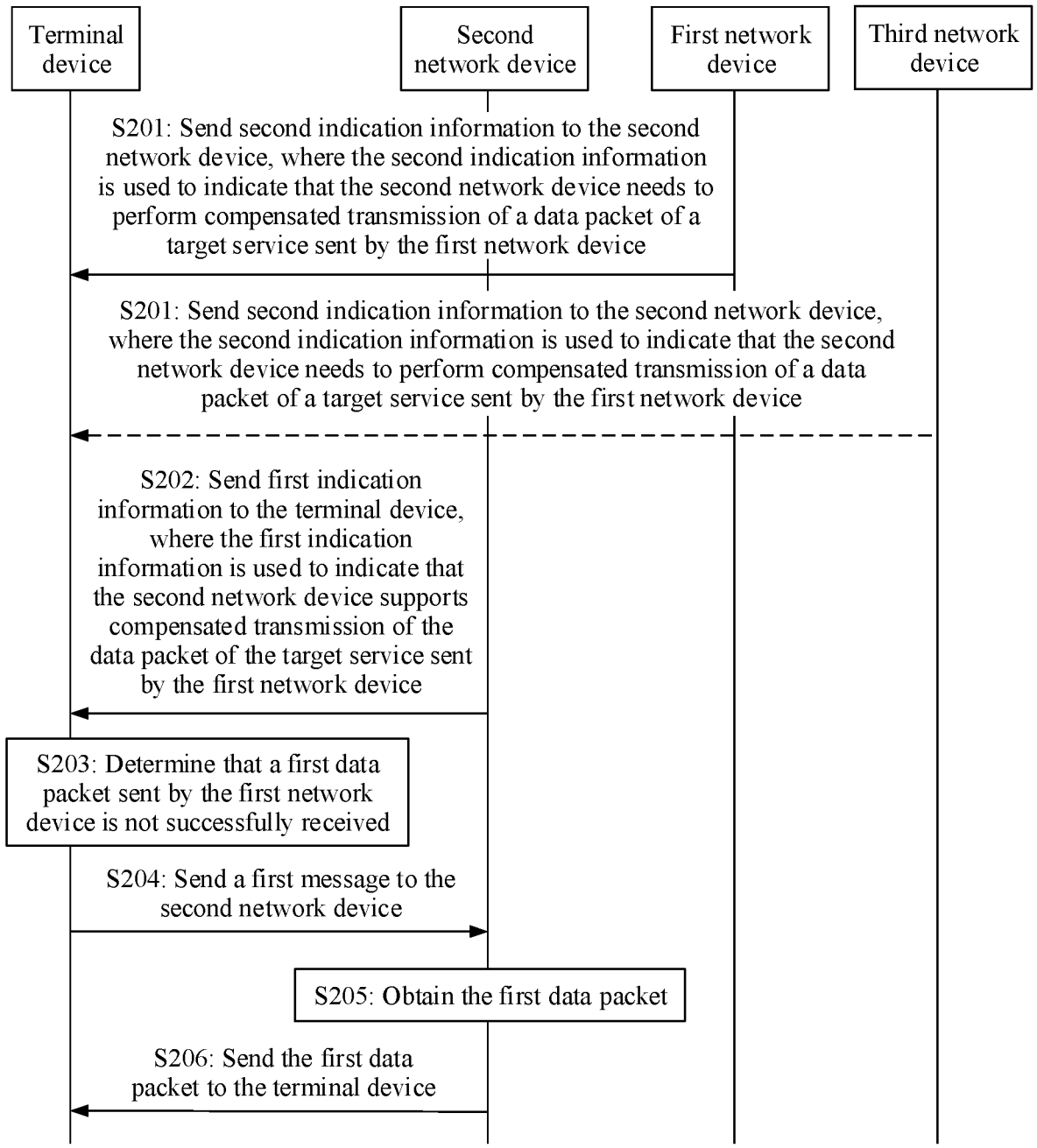
FIG. 4 is another flowchart of a communication method according to an embodiment of this application.

FIG. 4 is another flowchart of a communication method according to an embodiment of this application. Based on the foregoing Embodiment 3, as shown in FIG. 4, the method in this embodiment of this application may include the following steps.

S201: A first network device or a third network device sends second indication information to a second network device, where the second indication information is used to indicate that the second network device needs to perform compensated transmission of a data packet of a target service sent by the first network device.

In this step, the first network device or the third network device indicates that the second network device can perform compensated transmission of the data packet, so that the second network device may learn that the second network device can perform compensated transmission of the data packet for a terminal device.

Optionally, the second indication information carries a service identifier indicating that the second network device can perform compensated transmission. For example, the second indication information carries a service identifier of the target service. In this way, the second network device may learn, based on the service identifier that is of the target service and that is carried in the second indication information, that the second network device can perform compensated transmission of the data packet of the target service.

Optionally, in the embodiments of this application, the first network device and the second network device may be access network devices, and the third network device may be a core network device, for example, a gateway.

S202: The second network device sends first indication information to the terminal device, where the first indication information is used to indicate that the second network device supports compensated transmission of the data packet of the target service sent by the first network device.

After receiving the second indication information in the foregoing step, a second terminal device sends the first indication information to the terminal device, where the first indication information indicates that the second network device supports compensated transmission of the data packet of the target service sent by the first network device.

For example, the first indication information includes the service identifier of the target service. In this way, the terminal device may learn, based on the service identifier that is of the target service and that is carried in the first indication information, that the second network device can perform compensated transmission of the data packet of the target service. In a subsequent data transmission process, if the terminal device determines that the first data packet of the target service sent by the first network device is not successfully received, the terminal device may send a first message to the second network device, to request the second network device to send the first data packet of the target service to the terminal device, and the second network device performs compensated transmission of the first data packet of the target service. Therefore, reliability of communication between the first network device and the terminal device is improved, and a coverage requirement of the first network device on an edge terminal device is lowered, to allow the first network device to use a more efficient multicast transmission modulation scheme and coding rate, thereby improving spectral efficiency of multicast.

Optionally, the first indication information may be system broadcast information or a multicast control channel.

S203: The terminal device determines that the first data packet of the target service sent by the first network device is not successfully received.

S204: The terminal device sends the first message to the second network device.

For S203 and S204, refer to descriptions of S102 and S103. Details are not described herein again.

S205: The second network device obtains the first data packet.

It can be learned from steps S201 and S202 that it indicates that the second network device needs to perform compensated transmission of the data packet of the target service sent by the first network device, and the second network device notifies the terminal device of information that the second network device supports compensated transmission of the data packet of the target service sent by the first network device. In this way, if the terminal device determines that the first data packet of the target service sent by the first network device is not successfully received, the terminal device requests the second network device to retransmit the first data packet. Before the second network device retransmits the first data packet to the terminal device, the second network device first needs to obtain the first data packet.

A manner in which the second network device obtains the first data packet in this step includes but is not limited to the following examples.

In an example, S205 may include S205A1 and S205A2.

S205A1: The second network device sends a second message to the first network device or a third network device, where the second message is used to request the first data packet.

S205A2: The first network device or the third network device sends the first data packet to the second network device based on the second message.

For example, refer to FIG. 2. The second network device is communicatively connected to the first network device, and the second network device may send the second message to the first network device, to request the first network device to send the first data packet of the target service to the second network device. Optionally, the first message received by the second network device from the terminal device includes related information of the first data packet, which, for example, includes a data packet sequence number of the first data packet and a transmission time of the first data packet. In this way, the second network device may include the related information of the first data packet in the second message and send the second message to the first network device, so that the first network device sends the first data packet to the second network device based on the related information of the first data packet.

Figure 5:
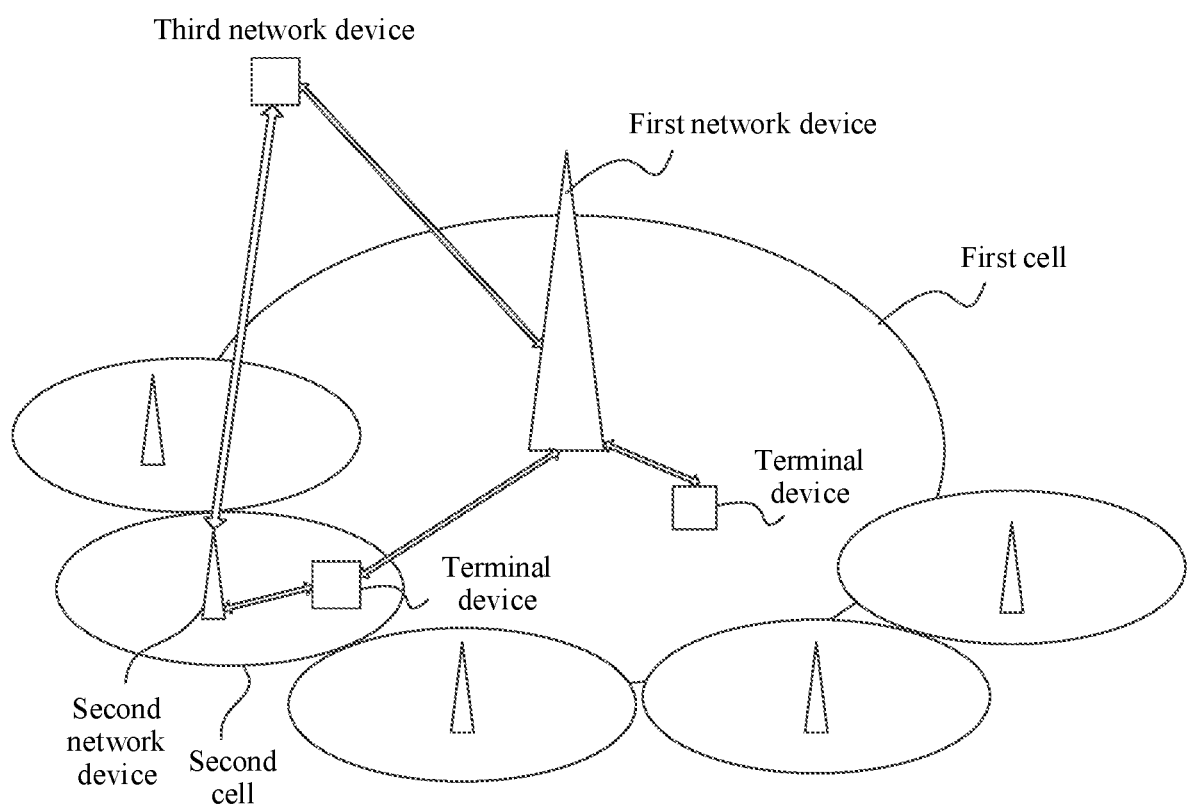
FIG. 5 is another schematic diagram of a communication system according to an embodiment of this application.

For example, refer to FIG. 5. Both the first network device and the second network device are communicatively connected to the third network device, and the second network device sends the second message to the third network device, to request the third network device to send the first data packet of the target service to the second network device. Optionally, the second network device includes related information of the first data packet in the second message and send the second message to the third network device, so that the third network device sends the first data packet to the second network device based on the related information of the first data packet.

In another example, S205 may include S205B1 and S205B2.

S205B1: The second network device receives the data packet of the target service from the first network device, where the data packet of the target service includes the first data packet.

S205B2: The second network device obtains the first data packet based on the data packet of the target service received from the first network device, where the data packet of the target service includes the first data packet.

Refer to FIG. 2. The first network device is communicatively connected to the second network device, and the first network device sends, to the second network device, each data packet of the target service sent to the terminal device.

Optionally, S205B1 may be performed before S101. To be specific, before sending the data packet of the target service to the terminal device, the first network device first sends the data packet to the second network device.

Optionally, S205B1 may be performed after S101. To be specific, after sending the data packet of the target service to the terminal device, the first network device sends the data packet to the second network device.

Optionally, S205B1 may be performed simultaneously with S101. To be specific, the first network device simultaneously sends the data packet of the target service to the terminal device and the second network device.

When receiving the first message sent by the terminal device, the second network device may obtain the first data packet from the data packet of the target service.

S206: The second network device sends the first data packet to the terminal device.

After obtaining the first data packet based on S205, the second network device sends the first data packet to the terminal device, to implement compensated transmission of the first data packet.

According to the communication method provided in this embodiment of this application, the first network device or the third network device indicates that the second network device needs to perform compensated transmission of the data packet of the target service sent by the first network device. Then, the second network device sends the first indication information to the terminal device, to indicate that the second network device supports compensated transmission of the data packet of the target service sent by the first network device. When determining that the first data packet of the target service sent by the first network device is not successfully received, the terminal device sends the first message to the second network device. The second network device obtains the first data packet, and sends the first data packet to the terminal device, to implement compensated retransmission on the first data packet. Therefore, the reliability of communication between the terminal device and the first network device is improved and the coverage requirement of the first network device on the edge terminal device is lowered, to allow the first network device to use the more efficient multicast transmission modulation scheme and coding rate, thereby improving the spectral efficiency of multicast.

Figure 6:
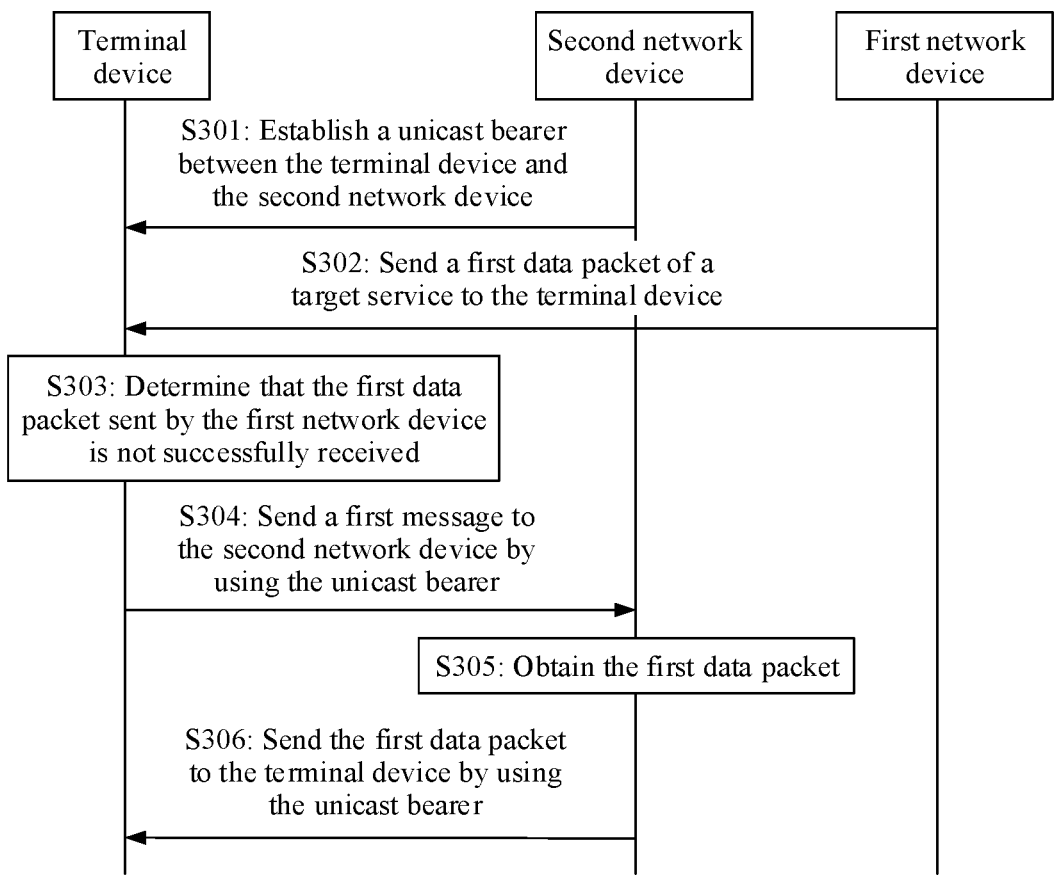
FIG. 6 is another flowchart of a communication method according to an embodiment of this application.

FIG. 6 is another flowchart of a communication method according to an embodiment of this application. Based on the embodiments shown in FIG. 3 and/or FIG. 4, as shown in FIG. 6, the method in this embodiment of this application may include the following steps.

S301: A unicast bearer is established between a terminal device and a second network device.

In this embodiment of this application, unicast transmission is performed between the terminal device and a network device. In unicast transmission, transmission efficiency is high, a delay is low, there is no interference of another device in transmission between the terminal device and the second network device, privacy is good, and data transmission reliability is high.

S302: A first network device sends a first data packet of a target service to the terminal device.

S303: The terminal device determines that the first data packet sent by the first network device is not successfully received.

S304: The terminal device sends a first message to the second network device by using the unicast bearer.

In this way, when the terminal device determines that the first data packet sent by the first network device is not successfully received, the terminal device may send the first message to the second network device by using the unicast bearer. Therefore, timeliness of sending the first message is improved, and the second network device can make a quick response.

S305: The second network device obtains the first data packet.

For this step, refer to descriptions of S205 or S104. Details are not described herein again.

S306: The second network device sends the first data packet to the terminal device by using the unicast bearer.

After obtaining the first data packet, the second network device sends the first data packet to the terminal device by using the unicast bearer, so that the first data packet is sent to the terminal device in time.

According to the communication method provided in this embodiment of this application, the unicast bearer is established between the terminal device and the second network device, so that the terminal device sends the first message to the second network device by using the unicast bearer, and the second network device sends the first data packet to the terminal device by using the unicast bearer. Therefore, timeliness of communication between the terminal device and the second network device is improved, and efficiency of compensated transmission by the second network device is improved.

Figure 7:
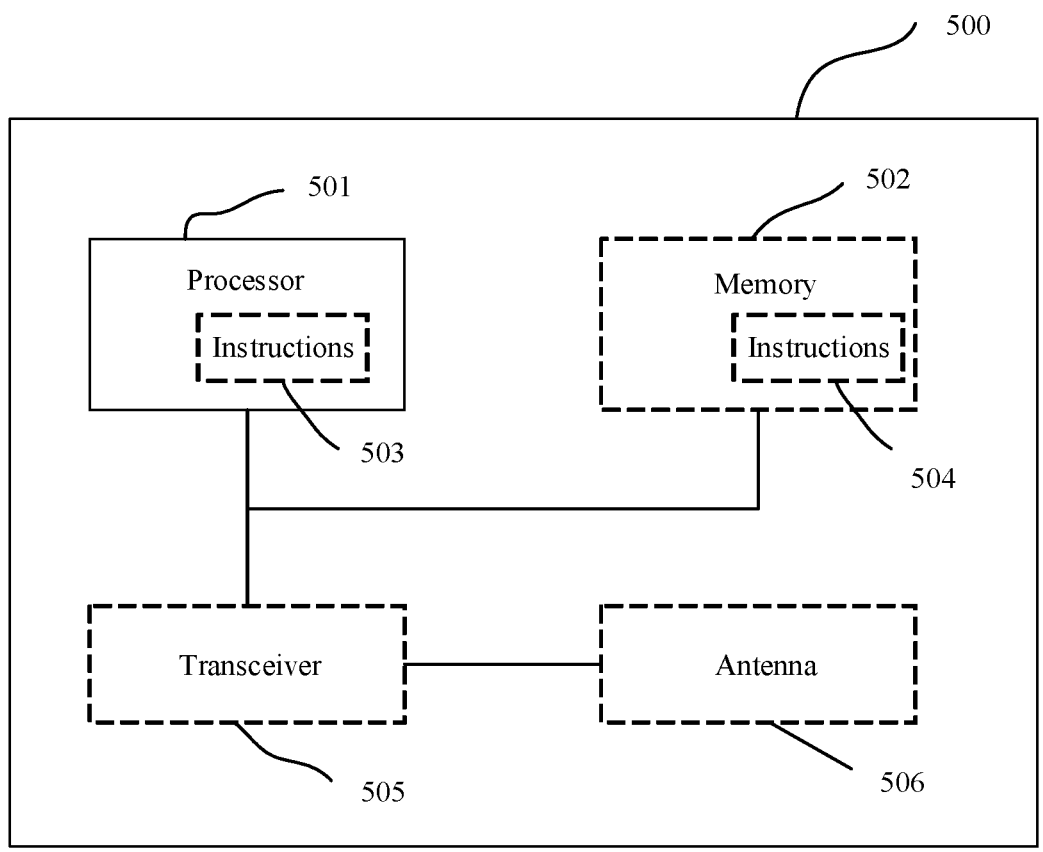
FIG. 7 is a schematic structural diagram of a communication device according to an embodiment of this application.

FIG. 7 is a schematic structural diagram of a communication device according to an embodiment of this application. As shown in FIG. 7, the communication device 500 in this embodiment may be the terminal device (or a component that can be used in the terminal device) or the second network device (or a component that can be used in the network device) mentioned in the foregoing method embodiments. The communication device may be configured to implement the methods that correspond to the terminal device or the second network device and that are described in the foregoing method embodiments. For details, refer to descriptions in the foregoing method embodiments.

The communication device 500 may include one or more processors 501. The processor 501 may also be referred to as a processing unit, and may implement a specific control or processing function. The processor 501 may be a general-purpose processor, a dedicated processor, or the like. For example, the processor may be a baseband processor or a central processing unit. The baseband processor may be configured to process a communication protocol and communication data. The central processing unit may be configured to control the communication device, execute a software program, and process data of the software program.

In a possible design, the processor 501 may also store instructions 503 or data (for example, intermediate data). The instructions 503 may be run by the processor, to enable the communication device 500 to perform the methods that correspond to the terminal device or the second network device and that are described in the foregoing method embodiments.

In another possible design, the communication device 500 may include a circuit, and the circuit may implement a sending, receiving, or communication function in the foregoing method embodiments.

Optionally, the communication device 500 may include one or more memories 502, where instructions 504 may be stored in the memory 502, and the instructions may be run on the processor, to enable the communication device 500 to perform the methods described in the foregoing method embodiments.

Optionally, the processor 501 and the memory 502 may be disposed separately or may be integrated together.

Optionally, the communication device 500 may further include a transceiver 505 and/or an antenna 506. The processor 501 may be referred to as a processing unit, and controls the communication device (for example, the terminal device or the network device). The transceiver 505 may be referred to as a transceiver unit, a transceiver, a transceiver circuit, or the like, and is configured to implement a transceiver function of the communication device.

In a design, the communication device 500 is configured to implement operations corresponding to the terminal device in the foregoing embodiments. For example, the processor 501 may determine that a first data packet of a target service sent by a first network device is not successfully received. The transceiver 505 sends a first message to a second network device, where the first message is used to request to retransmit the first data packet, and receives the first data packet from the second network device.

For specific implementation processes of the transceiver 505 and the processor 501, refer to related descriptions in the foregoing embodiments. Details are not described herein again.

In another design, the communication device is configured to implement operations corresponding to the second network device in the foregoing embodiments. For example, the transceiver 505 may receive a first message from a terminal device, where the first message is used to request to retransmit a first data packet of a target service sent by a first network device. The processor 501 obtains the first data packet, and then the transceiver 505 sends the first data packet to the terminal device.

For specific implementation processes of the transceiver 505 and the processor 501, refer to related descriptions in the foregoing embodiments. Details are not described herein again.

The processor 501 and the transceiver 505 that are described in this application may be implemented on an integrated circuit (integrated circuit, IC), an analog IC, a radio frequency integrated circuit (radio frequency integrated circuit, RFIC), a mixed signal IC, an application-specific integrated circuit (application specific integrated circuit, ASIC), a printed circuit board (printed circuit board, PCB), an electronic device, or the like. The processor 501 and the transceiver 505 may alternatively be manufactured by using various 1C technologies, for example, a complementary metal oxide semiconductor (complementary metal oxide semiconductor, CMOS), an n-type metal oxide semiconductor (nMetal-oxide-semiconductor, NMOS), a p-channel metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

Although in the descriptions of the foregoing embodiment, the communication device 500 is described by using the terminal device or the second network device as an example, a range of the communication device described in this application is not limited to the terminal device or the second network device, and a structure of the communication device may not be limited by FIG. 7.

The communication device in this embodiment of this application may be configured to perform the technical solutions performed by the terminal device (or the second network device) in the foregoing method embodiments. Implementation principles and technical effects thereof are similar, and details are not described herein again.

Figure 8:
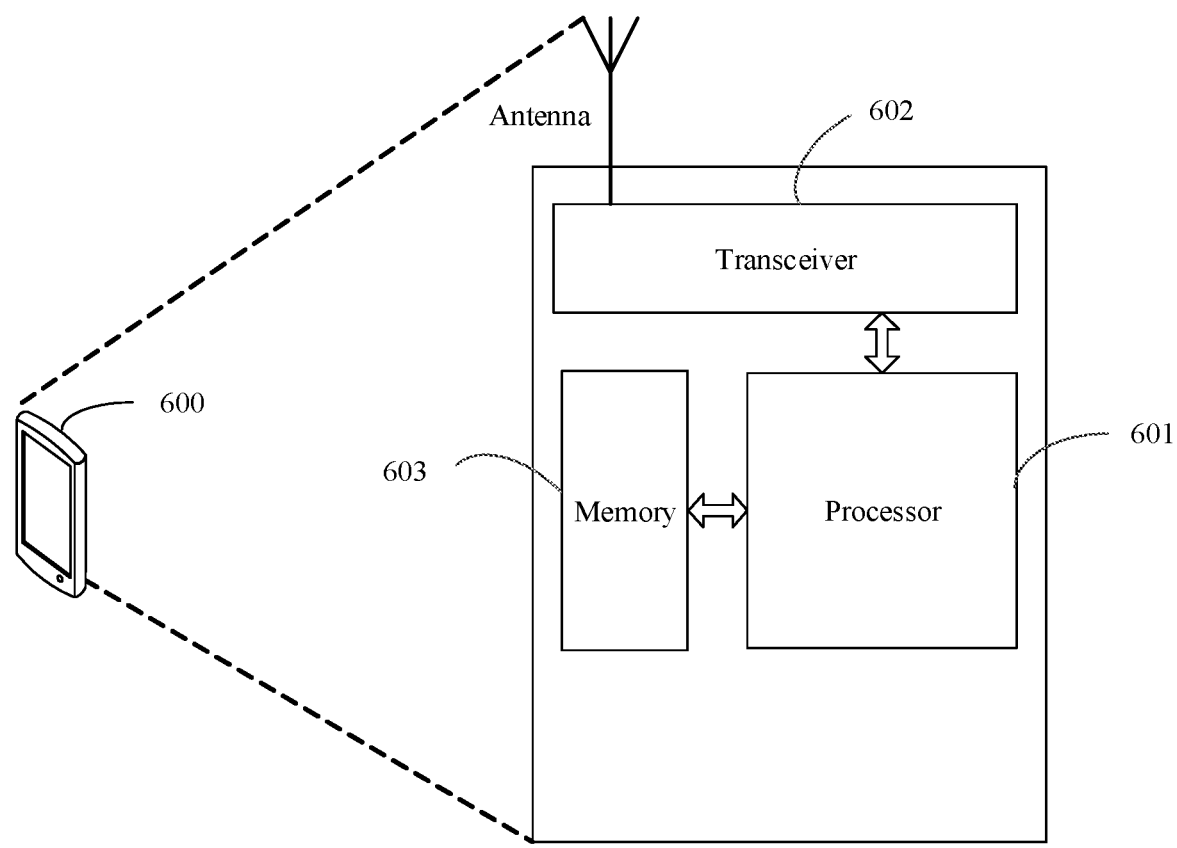
FIG. 8 is a schematic structural diagram of a terminal device according to an embodiment of this application.

FIG. 8 is a schematic structural diagram of a terminal device according to an embodiment of this application. The terminal device 600 may implement functions performed by the terminal device in the foregoing method embodiments. The functions may be implemented by hardware, or may be implemented by hardware by executing corresponding software. The hardware or software includes one or more modules or units corresponding to the foregoing functions.

In a possible design, a structure of the terminal device 600 includes a processor 601, a transceiver 602, and a memory 603. The processor 601 is configured to support the terminal device 600 in performing corresponding functions in the foregoing methods. The transceiver 602 is configured to support communication between the terminal device 600 and another terminal device or a network device. The terminal device 600 may further include the memory 603. The memory 603 is configured to be coupled to the processor 601, and stores program instructions and data that are necessary for the terminal device 600.

After the terminal device 600 is powered on, the processor 601 may read the program instructions and the data in the memory 603, interpret and execute the program instructions, and process data of the program instructions. When data is to be sent, after performing baseband processing on the to-be-sent data, the processor 601 outputs a baseband signal to the transceiver 602. After performing radio frequency processing on the baseband signal, the transceiver 602 sends a radio frequency signal in a form of an electromagnetic wave through an antenna. When data is sent to the terminal device, the transceiver 602 receives a radio frequency signal through the antenna, converts the radio frequency signal into a baseband signal, and outputs the baseband signal to the processor 601. The processor 601 converts the baseband signal into data and processes the data.

A person skilled in the art may understand that, for ease of description, FIG. 8 shows only one memory 603 and one processor 601. In an actual terminal device 600, there may be a plurality of processors 601 and a plurality of memories 603. The memory 603 may also be referred to as a storage medium, a storage device, or the like. This is not limited in this embodiment of this application.

The terminal device in this embodiment of this application may be configured to perform the technical solutions performed by the terminal device in the foregoing method embodiments. Implementation principles and technical effects thereof are similar, and details are not described herein again.

Figure 9:
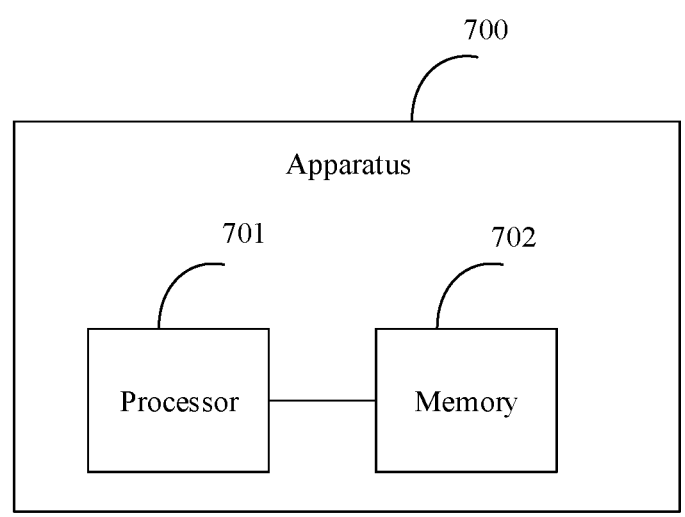
FIG. 9 is a schematic structural diagram of an apparatus according to an embodiment of this application.

FIG. 9 is a schematic structural diagram of an apparatus according to an embodiment of this application. The apparatus 700 exists in a product form of a chip. A structure of the apparatus includes a processor 701 and a memory 702. The memory 702 is configured to be coupled to the processor 701. The memory 702 stores program instructions and data that are necessary for the apparatus. The processor 701 is configured to execute the program instructions stored in the memory 702, to enable the apparatus to perform functions of the terminal device in the foregoing method embodiments.

The apparatus in this embodiment of this application may be configured to perform the technical solutions performed by the terminal device in the foregoing method embodiments. Implementation principles and technical effects thereof are similar, and details are not described herein again.

Figure 10:
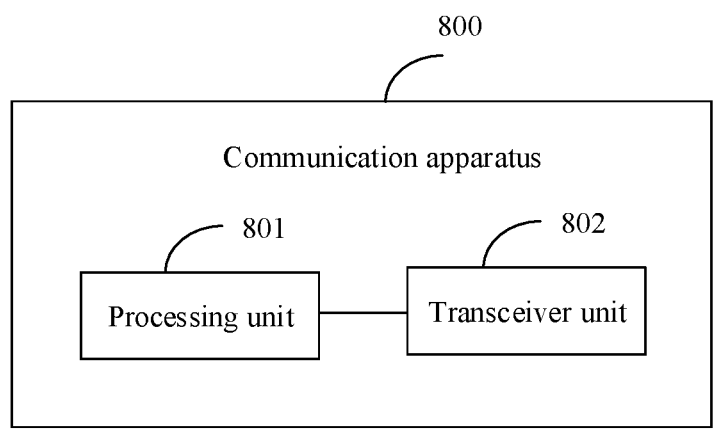
FIG. 10 is a schematic structural diagram of a communication apparatus according to an embodiment of this application.

FIG. 10 is a schematic structural diagram of a communication apparatus according to an embodiment of this application. The communication apparatus may be a terminal device, or may be a component (for example, an integrated circuit or a chip) of the terminal device. As shown in FIG. 10, the communication apparatus 800 may include a processing unit 801 and a transceiver unit 802.

The processing unit 801 is configured to determine that a first data packet of a target service sent by a first network device is not successfully received.

The transceiver unit 802 is configured to: send a first message to a second network device, where the first message is used to request to retransmit the first data packet; and receive the first data packet from the second network device.

In an implementation, the processing unit 801 is specifically configured to determine that the first data packet is not received. Alternatively, the processing unit 801 is configured to fail to parse the received first data packet.

In another implementation, the processing unit 801 is specifically configured to: determine, based on scheduling information that is of the first data packet and that is received from the first network device, that the first data packet is not received; or determine, based on a received sequence number of a data packet of the target service sent by the first network device, that the first data packet is not received; or determine, based on data packet transmission status information received from the second network device, that the first data packet is not received, where the data packet transmission status information is used to indicate a data packet of the target service currently transmitted by the first network device.

Optionally, the first message further includes related information of the first data packet.

Optionally, the related information of the first data packet includes at least one of the following: a data packet sequence number of the first data packet or a transmission time of the first data packet.

In another implementation, the processing unit 801 is further configured to establish a unicast bearer between the terminal device and the second network device.

The transceiver unit 802 is specifically configured to send the first message to the second network device by using the unicast bearer.

The transceiver unit 802 is further specifically configured to receive the first data packet from the second network device by using the unicast bearer.

Optionally, the first message is a radio link control RLC status report message or a packet data convergence protocol PDCP status report message.

In another implementation, the transceiver unit 802 is further configured to receive indication information from the second network device, where the indication information is used to indicate that the second network device supports compensated transmission of the data packet of the target service sent by the first network device.

Optionally, the target service is a multicast service.

The communication apparatus in this embodiment of this application may be configured to perform the technical solutions performed by the terminal device in the foregoing method embodiments. Implementation principles and technical effects thereof are similar, and details are not described herein again.

Figure 11:
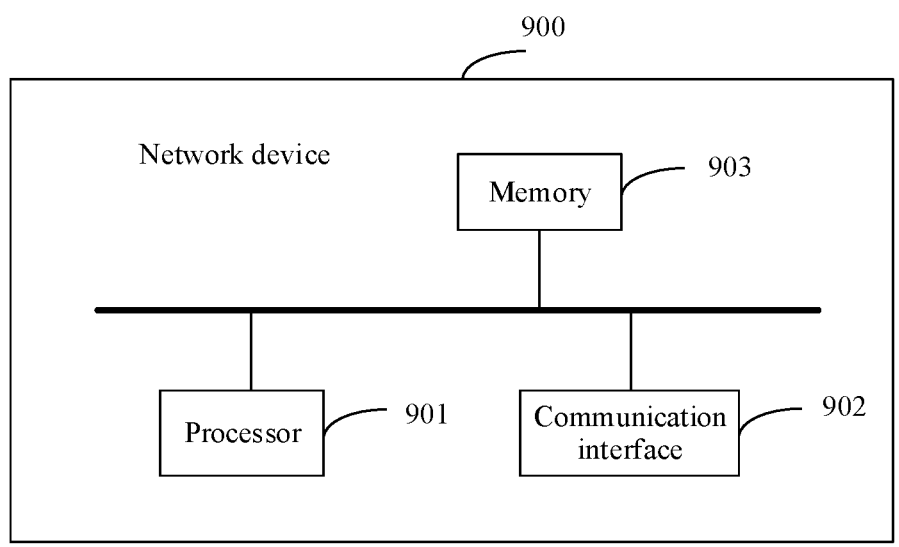
FIG. 11 is a schematic structural diagram of a second network device according to an embodiment of this application.

FIG. 11 is a schematic structural diagram of a second network device according to an embodiment of this application. The network device 900 may implement functions performed by the second network device in the foregoing method embodiments. The functions may be implemented by hardware, or may be implemented by hardware by executing corresponding software. The hardware or software includes one or more modules or units corresponding to the foregoing functions.

In a possible design, a structure of the second network device 900 includes a processor 901 and a communication interface 902, and the processor 901 is configured to support the second network device 900 in performing corresponding functions in the foregoing methods. The communication interface 902 is configured to support communication between the second network device 900 and another network element. The second network device 900 may further include a memory 903. The memory 903 is configured to be coupled to the processor 901, and stores program instructions and data that are necessary for the second network device 900.

A person skilled in the art may understand that, for ease of description, FIG. 11 shows only one memory 903 and one processor 901. In an actual second network device 900, there may be a plurality of processors 901 and a plurality of memories 903. The memory 903 may also be referred to as a storage medium, a storage device, or the like. This is not limited in this embodiment of this application.

The second network device in this embodiment of this application may be configured to perform the technical solutions performed by the second network device in the foregoing method embodiments. Implementation principles and technical effects thereof are similar, and details are not described herein again.

Figure 12:
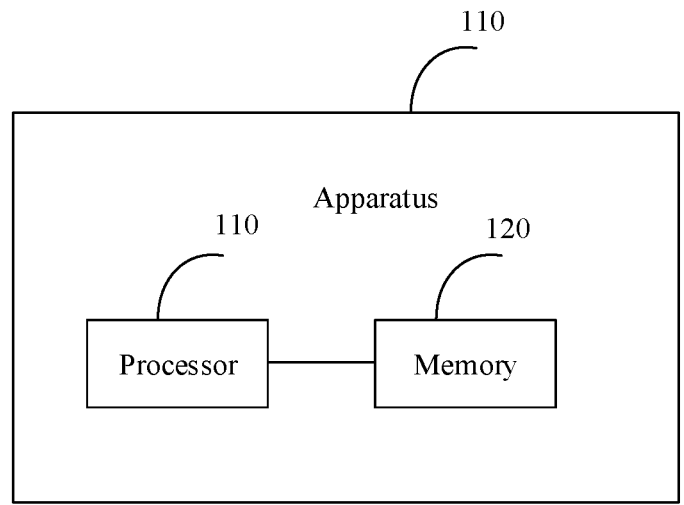
FIG. 12 is a schematic structural diagram of an apparatus according to an embodiment of this application.

FIG. 12 is a schematic structural diagram of an apparatus according to an embodiment of this application. The apparatus 100 exists in a product form of a chip. A structure of the apparatus includes a processor 110 and a memory 120. The memory 120 is configured to be coupled to the processor 110. The memory 120 stores program instructions and data that are necessary for the apparatus. The processor 110 is configured to execute the program instructions stored in the memory 120, to enable the apparatus to perform functions of the second network device in the foregoing method embodiments.

The apparatus in this embodiment of this application may be configured to perform the technical solutions performed by the second network device in the foregoing method embodiments. Implementation principles and technical effects thereof are similar, and details are not described herein again.

Figure 13:
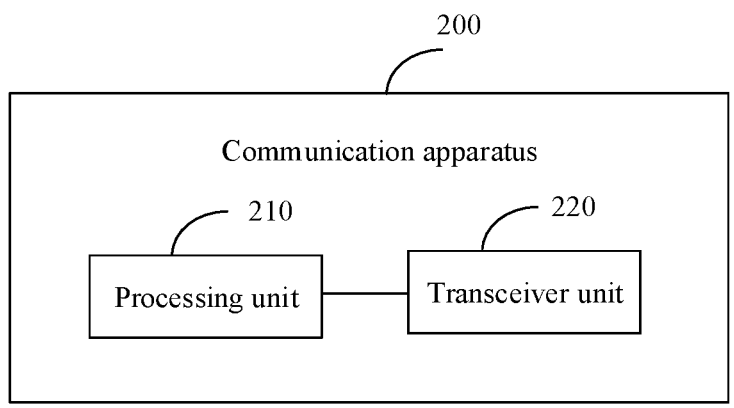
FIG. 13 is a schematic structural diagram of a communication apparatus according to an embodiment of this application.

FIG. 13 is a schematic structural diagram of a communication apparatus according to an embodiment of this application. The communication apparatus may be a second network device, or may be a component (for example, an integrated circuit or a chip) of the second network device. As shown in FIG. 13, the communication apparatus 200 may include: a transceiver unit 220, configured to receive a first message from a terminal device, where the first message is used to request to retransmit a first data packet of a target service sent by a first network device; and a processing unit 210, configured to obtain the first data packet, and send the first data packet to the terminal device.

In a possible implementation, the transceiver unit is further configured to: receive data packet transmission status information from the first network device, where the data packet transmission status information is used to indicate a data packet of the target service currently transmitted by the first network device; send the data packet transmission status information to the terminal device.

Optionally, the first message further includes related information of the first data packet.

Optionally, the related information of the first data packet includes at least one of the following: a data packet sequence number of the first data packet or a transmission time of the first data packet.

In another possible implementation, the processing unit 210 is further configured to establish a unicast bearer between the terminal device and the second network device.

The transceiver unit 220 is specifically configured to receive the first message from the terminal device by using the unicast bearer.

The transceiver unit 220 is further specifically configured to send the first data packet to the terminal device by using the unicast bearer.

In another possible implementation, the transceiver unit 220 is further configured to send first indication information to the terminal device, where the first indication information is used to indicate that the second network device supports compensated transmission of a data packet of the target service sent by the first network device.

In another possible implementation, the transceiver unit 220 is further configured to receive second indication information from the first network device or a third network device, where the second indication information is used to indicate that the second network device needs to perform compensated transmission of the data packet of the target service sent by the first network device.

In another possible implementation, the transceiver unit 220 is further configured to: send a second message to the first network device or a third network device, where the second message is used to request the first data packet; and receive the first data packet from the first network device or the third network device.

Optionally, the first network device and the second network device are access network devices, and the third network device is a core network device.

In another possible implementation, the transceiver unit 220 is further configured to receive a data packet of the target service from the first network device.

The processing unit 210 is specifically configured to obtain the first data packet based on the data packet of the target service received from the first network device, where the data packet of the target service includes the first data packet.

Optionally, the target service is a multicast service.

The communication apparatus in this embodiment of this application may be configured to perform the technical solutions performed by the second network device in the foregoing method embodiments. Implementation principles and technical effects thereof are similar, and details are not described herein again.

Figure 14:
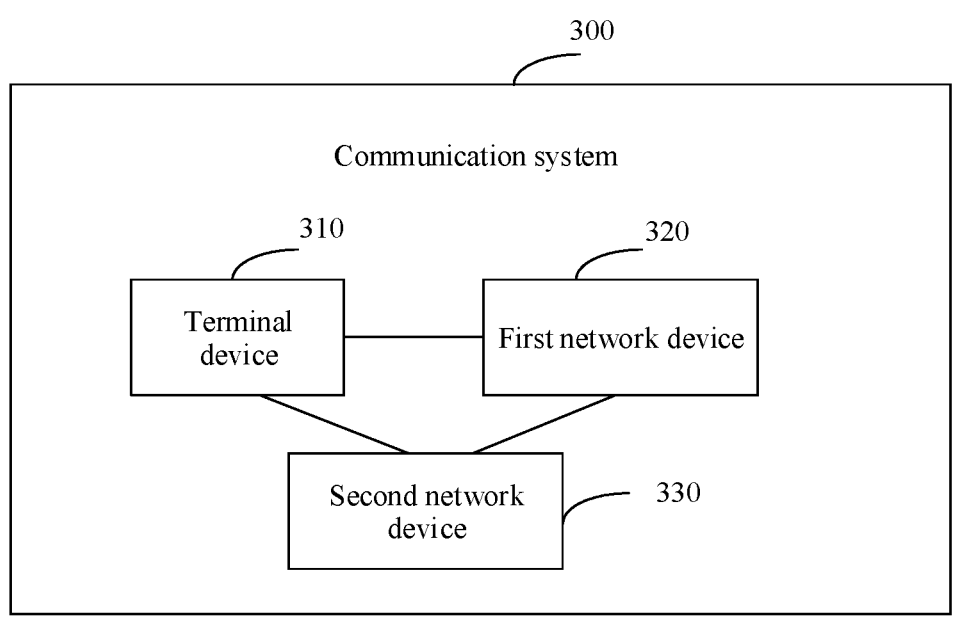
FIG. 14 is a schematic structural diagram of a communication system according to an embodiment of this application.

FIG. 14 is a schematic structural diagram of a communication system according to an embodiment of this application. As shown in 14, the communication system 300 in this embodiment of this application includes the terminal device 310, the first network device 320, and the second network device 330.

The terminal device 310 may be configured to implement functions of the terminal device in the foregoing method embodiments, and the second network device 330 may be configured to implement functions on a second network device side in the foregoing method embodiments. Implementation principles and technical effects thereof are similar, and details are not described herein again.

Based on such an understanding, the technical solutions of this application essentially, or the part contributing to a current technology, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, and an optical disc.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by a person skilled in the art that, for the purpose of convenient and brief description, for a detailed working process of the foregoing system, apparatus, and unit, refer to a corresponding process in the method embodiments. Details are not described herein again. In addition, mutual reference may also be made between the method embodiments and between the apparatus embodiments, and same or corresponding content in different embodiments may be cross-referenced. Details are not described herein again.

What is claimed is:

1. A communication method, comprising:
   determining, by a terminal device, that a first data packet of a target service sent by a first network device is not successfully received;
   receiving, by the terminal device, indication information from a second network device, wherein the indication information indicates that the second network device supports compensated transmission of the first data packet of the target service sent by the first network device;
   sending, by the terminal device, a first message to the second network device, wherein the first message requests to retransmit the first data packet; and
   receiving, by the terminal device, the first data packet from the second network device.

2. The method according to claim 1, wherein determining that the first data packet sent by the first network device is not successfully received comprises:
   determining, by the terminal device, that the first data packet is not received; or
   failing, by the terminal device, to parse the received first data packet.

3. The method according to claim 2, wherein determining that the first data packet is not received comprises:
   determining, by the terminal device, that the first data packet is not received based on scheduling information, wherein the scheduling information is of the first data packet and is received from the first network device; or
   determining, by the terminal device, that the first data packet is not received based on a received sequence number of a data packet of the target service sent by the first network device; or
   determining, by the terminal device, that the first data packet is not received based on data packet transmission status information received from the second network device, wherein the data packet transmission status information indicates a data packet of the target service currently transmitted by the first network device.

4. The method according to claim 1, wherein the first message comprises related information of the first data packet.

5. The method according to claim 4, wherein the related information of the first data packet comprises at least one of the following: a data packet sequence number of the first data packet or a transmission time of the first data packet.

6. The method according to claim 1, wherein the method comprises:
   establishing a unicast bearer between the terminal device and the second network device; and wherein sending the first message to the second network device comprises:
   sending, by the terminal device, the first message to the second network device by using the unicast bearer; and wherein receiving the first data packet from the second network device comprises:

receiving, by the terminal device, the first data packet from the second network device by using the unicast bearer.

7. The method according to claim 6, wherein the first message is a radio link control (RLC) status report message or a packet data convergence protocol (PDCP) status report message.

8. The method according to claim 1, wherein the target service is a multicast service.

9. The method according to claim 1, wherein the first network device and the second network device are access network devices.

10. A communication method, comprising:
sending, by a second network device, first indication information to a terminal device, wherein the first indication information indicates that the second network device supports compensated transmission of a first data packet of a target service sent by a first network device;
receiving, by the second network device, a first message from the terminal device, wherein the first message requests to retransmit the first data packet of the target service sent by the first network device;
obtaining, by the second network device, the first data packet; and
sending, by the second network device, the first data packet to the terminal device.

11. The method according to claim 10, wherein before receiving the first message from the terminal device, the method comprises:
receiving, by the second network device, data packet transmission status information from a first network device, wherein the data packet transmission status information indicates a data packet of the target service currently transmitted by the first network device; and
sending, by the second network device, the data packet transmission status information to the terminal device.

12. The method according to claim 10, wherein the first message comprises related information of the first data packet.

13. The method according to claim 12, wherein the related information of the first data packet comprises at least one of the following: a data packet sequence number of the first data packet or a transmission time of the first data packet.

14. The method according to claim 10, wherein the method comprises:
establishing a unicast bearer between the terminal device and the second network device; and wherein receiving the first message from the terminal device comprises:
receiving, by the second network device, the first message from the terminal device by using the unicast bearer; and wherein sending the first data packet to the terminal device comprises:
sending, by the second network device, the first data packet to the terminal device by using the unicast bearer.

15. The method according to claim 10, wherein before sending the first indication information to the terminal device, the method comprises:
receiving, by the second network device, second indication information from the first network device or a third network device, wherein the second indication information indicates that the second network device needs to perform compensated transmission of the data packet of the target service sent by the first network device.

16. The method according to claim 10, wherein obtaining the first data packet comprises:
sending, by the second network device, a second message to the first network device or a third network device, wherein the second message requests the first data packet; and
receiving, by the second network device, the first data packet from the first network device or the third network device.

17. The method according to claim 16, wherein the first network device and the second network device are access network devices, and the third network device is a core network device.

18. The method according to claim 10, wherein before obtaining the first data packet, the method comprises:
receiving, by the second network device, a data packet of the target service from the first network device; and wherein obtaining the first data packet comprises:
obtaining, by the second network device, the first data packet based on the data packet of the target service received from the first network device, wherein the data packet of the target service comprises the first data packet.

19. The method according to claim 10, wherein the target service is a multicast service.

20. A terminal device, comprising:
at least one processor; and
one or more memories coupled to the at least one processor and storing programming instructions for execution by the at least one processor to perform operations comprising:
determining that a first data packet of a target service sent by a first network device is not successfully received;
receiving indication information from a second network device, wherein the indication information indicates that the second network device supports compensated transmission of the first data packet of the target service sent by the first network device;
sending a first message to the second network device, wherein the first message requests to retransmit the first data packet; and
receiving the first data packet from the second network device.

* * * * *